United States Patent [19]
Tankovich

[11] Patent Number: 5,614,339
[45] Date of Patent: Mar. 25, 1997

[54] OBJECT RECYCLING BY LASER OF COATING MATERIAL

[75] Inventor: Nikolai Tankovich, San Diego, Calif.

[73] Assignee: Lumedics, Ltd., San Diego, Calif.

[21] Appl. No.: 512,825

[22] Filed: Aug. 9, 1995

[51] Int. Cl.$^6$ .............................. B05D 3/06; G21H 5/00; B23K 26/00
[52] U.S. Cl. ................ 430/19; 430/945; 219/121.6; 219/121.76; 219/121.8; 219/121.82; 219/121.85; 427/554; 427/555
[58] Field of Search ............... 430/19, 945; 219/121.68, 219/121.69, 121.76, 121.82, 121.85, 121.6, 121.8; 427/554, 55, 534, 535, 536; 346/21

[56] References Cited

U.S. PATENT DOCUMENTS

| | | | |
|---|---|---|---|
| 3,787,210 | 1/1974 | Roberts | 430/945 |
| 4,803,021 | 2/1989 | Werth et al. | 219/121.68 |
| 5,166,041 | 11/1992 | Murofushi et al. | 430/339 |

Primary Examiner—John A. McPherson
Attorney, Agent, or Firm—Baker, Maxham, Jester & Meador

[57] ABSTRACT

Coated objects are recycled by irradiation with a laser beam. The invention is applied to objects (such as documents) that include an entry surface, a surface coated with a coating (such as text or graphics printed with copier or printer toner), and a body interposed between the surface. A laser beam is directed toward a target region of the coated surface, traveling first through the object's entry surface and body, which are translucent or transparent to the wavelength of light contained in the laser beam. The laser beam generates a plasma shock wave at the target region of the coated surface, thereby discharging particles of the coating located near the target region. The discharged printed matter is discharged away from the object, thereby avoiding undesired impregnation of the coating into the object. Discharged coating may be recycled by collection and subsequent reuse.

115 Claims, 4 Drawing Sheets

OBJECT RECYCLING BY LASER OF COATING MATERIAL

BACKGROUND OF THE INVENTION

1. Field of the Invention

The present invention generally relates to the removal of coating material from various objects. More particularly, the invention concerns a method and apparatus to recycle documents by using a laser to erase toner, ink, or similar material from the documents.

2. Description of the Related Art

Paper recycling is an important part of the present recycling industry. Recycled paper is used in greeting cards, tissue paper, cardstock, and a variety of other paper-based products. With increasing worldwide concern for the environment, interest in paper recycling is higher than ever.

The primary system for recycling paper today involves a "re-pulping" approach, which uses a combination of chemical and mechanical means. In this system, a large volume of used paper is typically ground into a mash, treated with certain known bleaching chemicals, and then reconstituted into sheet form.

As an alternative to the "re-pulping" system, many have attempted to recycle paper using various non-destructive whitening methods. Broadly, known non-destructive whitening methods clean printed paper "as is", without breaking the paper down into pulp and pressing and drying it back into sheet form. Known whitening methods typically employ chemical agents to dissolve toner, bleaching agents to whiten paper, and chemical and/or mechanical pealing agents to remove printing.

For some recycling applications, the known whitening methods may be adequate. However, for many users these techniques are not completely satisfactory. These methods, for example, often use dangerous chemicals that may be poisonous to humans. This presents a significant risk of injury to recycling personnel, and also requires comprehensive chemical handling and disposal procedures. Moreover, some users may find non-destructive whitening methods to be too slow and expensive for their applications. Also, these techniques may damage the paper surface, rendering the paper unusable for some purposes.

Prior to the present invention, the use of lasers in document recycling has been unknown. In a completely dissimilar field, however, lasers have been used to perform "surface cleaning" of various hard, opaque objects. Several companies, for instance, use lasers to remove paint from metal surfaces of airplanes and ships. Others have applied lasers to clean the surface of stonework, buildings, and other hard opaque objects.

Figure 1:
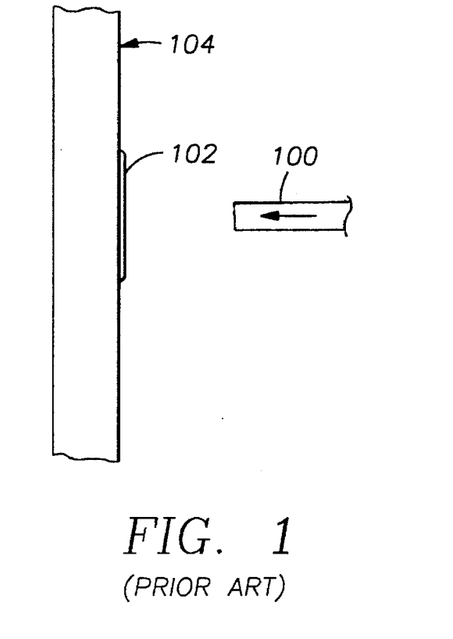
FIG. 1 is a diagram showing the relationship between a laser beam, coating, and underlying object in known surface cleaning techniques.
Figure 2:
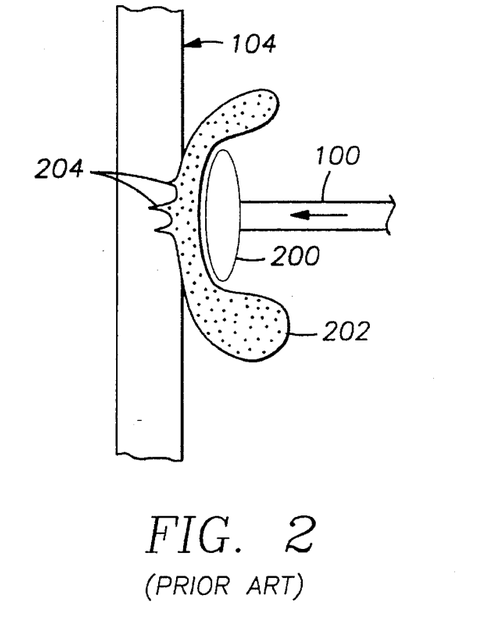
FIG. 2 is a diagram showing the effects of known surface cleaning techniques.

As shown in FIG. 1, these prior surface cleaning techniques operate simply by impinging a laser beam 100 onto the undesirable coating 102. The coating 102 is adhered to an underlying object 104. When the laser 100 contacts the coating 102, the laser is absorbed by the coating 102 which then creates a plasma shock wave 200 (FIG. 2). Although the plasma shock wave 200 is oriented toward the object 104, the wave 200 and the underlying object 104 cooperate to discharged a significant portion 202 of the coating proximate the laser beam 100. The discharged material 202 is effectively removed from the object.

For many applications, the known laser-based surface cleaning techniques satisfy their user's expectations. However, the present inventors have discovered that certain characteristics of these methods yield poor performance when applied to the task of paper cleaning. With a rigid surface such as the aluminum skin of an airplane (e.g. FIGS. 1–2), the underlying object 104 effectively repels the coating 202 proximate the laser beam 100. However, the portion of coating 204 directly impinged by the laser beam 100 is not repelled so effectively. In fact, some of the coating 204 may be impregnated into the object 104. In the case of a rigid surface such as a metal substance, this impregnation is minimized due to the difference in hardness between the relatively hard object and the relative soft coating.

The inventors have discovered that, unlike hard surfaces such as metal, paper is quite susceptible to coating impregnation during conventional laser-based surface cleaning. As a result, the impinging laser not only does a poor job of removing the coating, but it also causes a significant level of paper damage. As a result, an improved paper recycling technique is still needed.

SUMMARY OF THE INVENTION

Broadly, the present invention concerns a method and apparatus to clean and recycle objects by using a laser to remove coatings therefrom. More specifically, one embodiment of the invention projects a laser through an entry surface and a body of a document that is translucent to the laser's wavelength. The document's body is interposed between the entry surface and a printed surface bearing printed matter such as printed text or graphics. The laser beam generates a plasma shock wave directed at a target region of the printed surface, propelling nearby printed matter from the target region of the document. The propelled printed matter may be collected by a number of different means, for subsequent reuse.

In a specific embodiment, the invention may comprise a method or apparatus to erase printer or copier toner from printed sheets of paper by directing a laser through the printed sheets' unprinted undersurface.

The invention affords its users with a number of distinct advantages. First, unlike prior recycling systems, the present invention cleans printed documents with a modicum of time. In this respect, one embodiment of the invention comprises a machine that may be operated like a laser printer or a copier, by sequentially feeding sheets of paper into the machine, with similar processing time. Another advantage is that the invention avoids the use of hazardous chemicals required by prior recycling techniques. And, unlike known "surface cleaning" methods used for removing coatings from hard objects, the present invention neither damages the object nor impregnates the object's surface with the coating.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

General

Broadly, the present invention concerns a method and apparatus for removing a coating adhered to a coated surface of an translucent or transparent object by impinging a laser beam upon the coming from the object's (uncoated) undersurface. The invention is especially effective when used to erase printer, toner, copier toner, or laserjet ink from documents such as sheets of paper.

Figure 3:
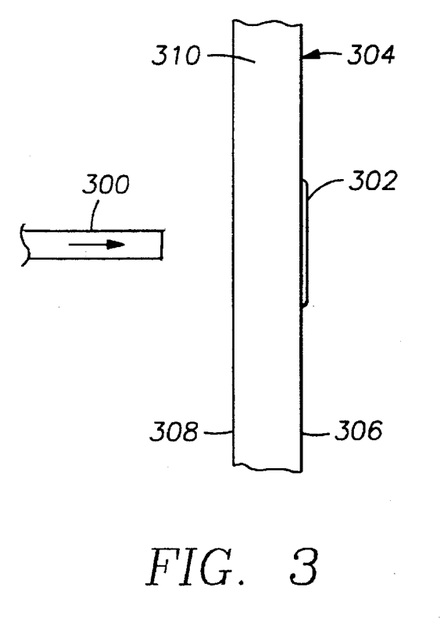
FIG. 3 is a diagram showing the relationship between a laser beam, coating, and underlying object in accordance with recycling technique of the invention.
Figure 4:
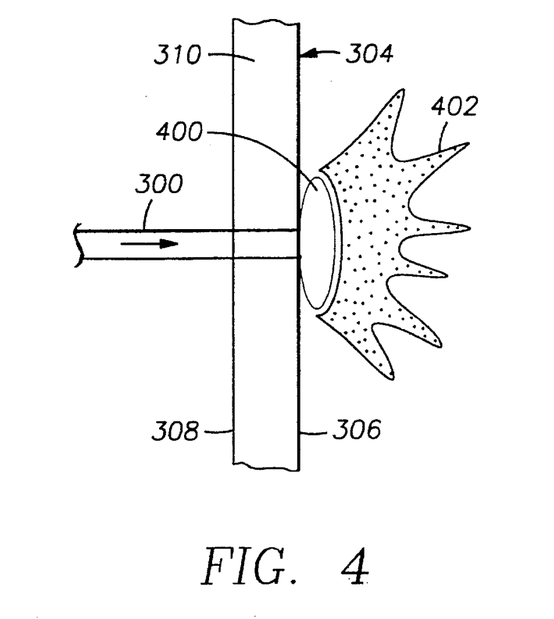
FIG. 4 is a diagram showing the effects of the recycling technique of the invention.

FIG. 3 depicts the relationship between a laser beam 300, coating 302, and an underlying object 304 in accordance with the recycling technique of the invention. The underlying object 304 includes an coated surface 306, an (uncoated) entry surface 308, and a body 310. The laser beam 300 passes through the entry surface 308 and the body 310 prior to impinging upon the coating 302 adhered to the coated surface 306. FIG. 4 illustrates the result; namely, the laser beam 300 creates a plasma shock wave 400 at the coated surface 306. However, unlike known surface cleaning techniques, the plasma shock wave 400 is oriented away from the object 304. As a result, the coating 302 is completely discharged from the surface 306, as shown by the discharge 402.

Structure

Figure 5:
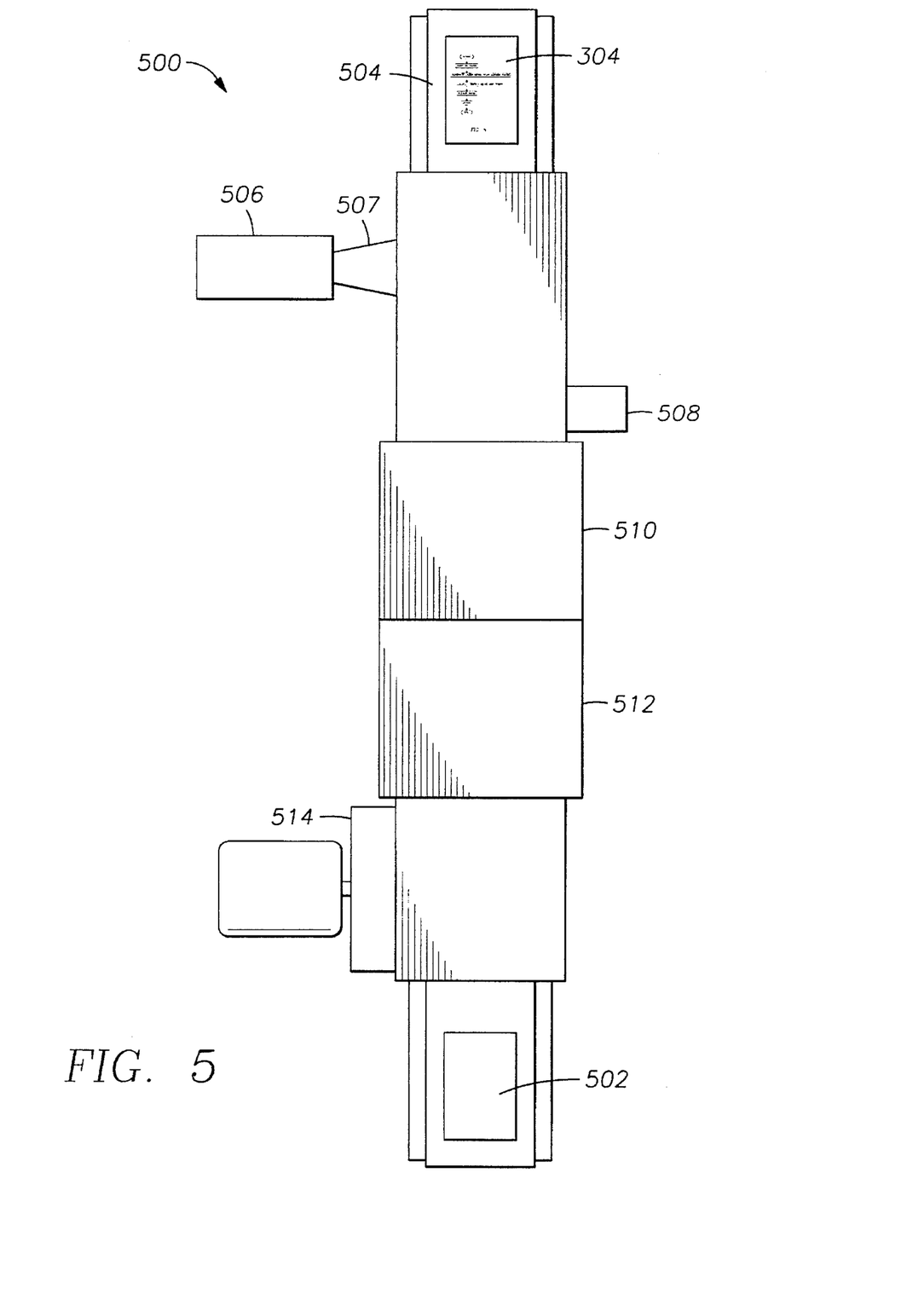
FIG. 5 is a diagram illustrating a recycling apparatus in accordance with the invention.

Referring to FIGS. 3–4 and 5, description is made of the hardware components of one embodiment of recycling apparatus 500 embodying the invention. In the illustrated embodiment, the apparatus 500 receives an object 304 and recycles it to provide a cleaned object 502. The object 304 may comprise, for example, a sheet of white or colored paper, or a transparency sheet for use with overhead projectors. The apparatus 500 includes a conveyor 504 to receive and position the object 304. The conveyor 504 may comprise one or more rollers, a conveyor belt, a slidable paper tray, or another suitable device(s) for transporting the object 304 and supporting it in a prescribed position. In one embodiment, the conveyor 504 may be similar to mechanisms used in commercial laser printers to transport paper from a paper tray and pass it to a printing position and subsequently deliver the printed paper to an exit tray.

The apparatus 500 also includes a laser 506. Preferably, the laser 506 comprises a Q-switched Nd:YAG laser. However, the laser 506 may comprise a Dye, Ruby, Alexandrite laser, Titanium Sapphire laser, double-frequency laser, Er:Glass Eye Safety laser, or another suitable type of laser. The laser need not by Q-switched and may operate in a multi or free running mode as an alternative.

The laser 506 functions under operating parameters selected for the laser to irradiate the sheet while quickly ejecting the coating before the paper is overheated or otherwise damaged. The operating parameters therefore consider the composition of the sheet, the sheet's density, and the type of coating to be removed. Additionally, the wavelength of laser is selected to ensure that the particular color and composition of the sheet (or other object) is translucent (i.e. not opaque) to the laser. For white paper, any laser wavelength provides satisfactory results. For colored paper, invisible wavelengths are preferable to minimize absorption of the laser beam by the paper. For cleaning an assortment of white and multicolored paper, then, the appropriate wavelength is preferably provided by a combination of several lasers including Nd:YAG operating at both the fundamental wavelength of 1.064 μm and operating at the frequency-tripled UV wavelength of 0.355 μm. Therefore, the laser 506 may comprise multiple lasers, if desired.

As an example, for the different coating types as listed, the laser 506 may exhibit parameters such as those of Table 1, below.

TABLE 1

|  | First Example Printer Toner | Second Example Copier Toner | Third Example Laserjet Ink |
| --- | --- | --- | --- |
| Pulse Energy Density | 2.2 J/cm$^2$ | 1.5 J/cm$^2$ | 2.8 J/cm$^2$ |
| Pulse Width | 50 ns | 50 ns | 50 ns |
| Repetition Rate | 200 Hz | 200 Hz | 200 Hz |
| Spot Size Diameter | 5 mm | 5 mm | 5 mm |

As shown in Table 1, the laser may be operated in the pulsed mode. The pulse repetition rate of the laser does not affect the cleaning process. The pulse repetition rate only affects the time required to clean any given object.

As an alternative to the description above, the laser 506 may comprise one or more semiconductor lasers. For instance, multiple semiconductor lasers may be assembled into a "pooled laser cell" or "laser array." The array may therefore be sufficiently large to process an entire object 304 simultaneously. Or, if the pooled laser cell is smaller than one object 304, the cell may therefore be scanned across the page 502 with a scanner 507, discussed below.

For more efficient use of the laser 506, the apparatus 500 may include a scanner 507 to selectively shape and scan the laser beam (or laser array) across the object 304. The scanner 507 may comprise, for example, a motor attached to a laser steering mirror, a selectively rotatable multi-faceted diamond mirror, or another suitable device.

In an exemplary embodiment, the time required to clean an 8½"×11" sheet of paper of unwanted toner ink maybe calculated as follows. In this example, the beam is preshaped into a cylinder of 50 mm×5 mm and the laser is scanned horizontally from left to right across one line then returned to the left side of the next line. Using a 50% overlap from one step to the next as the laser is scanned over the entire sheet, the step sizes in the horizontal ("$S_H$") and vertically ("$S_V$") dimensions are defined by Equations 1 and 2, below.

$$S_H = \frac{50 \text{ mm}}{2} \quad [1]$$

$$S_V = \frac{5 \text{ mm}}{2} \quad [2]$$

The number of steps in the horizontal ("$N_H$") and vertical ("$N_V$") directions are shown by Equations 3 and 4, below.

$$n_H = \frac{8.5 \text{ inches} \times 25.4 \frac{\text{mm}}{\text{inches}}}{S_H} \quad [3]$$

$$n_V = \frac{11 \text{ inches} \times 25.4 \frac{\text{mm}}{\text{inches}}}{S_V} \quad [4]$$

Accordingly, the total number of steps ("$n_{tot}$") is shown by Equations 5, below.

$$n_{tot} = n_H \cdot n_V = 965 \quad [5]$$

For a laser with a pulse repetition rate ("prf") of 200 Hz, with a number of pulses per step ("N") of 3, the dwell ("d") is shown by Equation 6, below.

$$d = \frac{N}{prf} = \frac{3}{200} \quad [6]$$

The total time required therefore appears as shown by Equation 7, below.

$$T = n_{tot} \cdot d = 965 \cdot \frac{3}{200} = \text{about 15 seconds} \quad [7]$$

Figure 6:
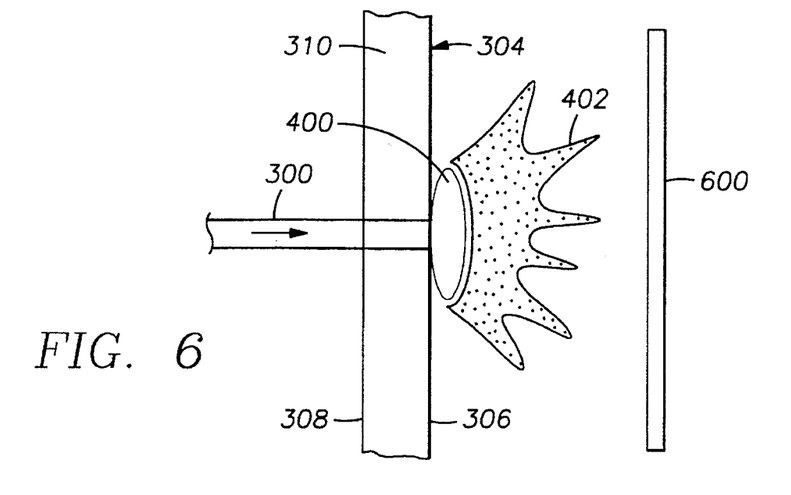
FIG. 6 is a diagram illustrating a first embodiment of a print collector of the invention.

Referring again to FIG. 5, another component of the apparatus 500 is a print collector 508, which collects coating material ejected from the object 304 by the laser 506. In one embodiment, the collector 508 may comprise an ionized collector plate 600 (FIG. 6), placed near the coated surface 306 of the sheet 304 attracts and collects particles of coating 402 ejected from the sheet 304. The collector plate 600 may comprise, for example, aluminum, steel, or another suitable substance.

Figure 7:
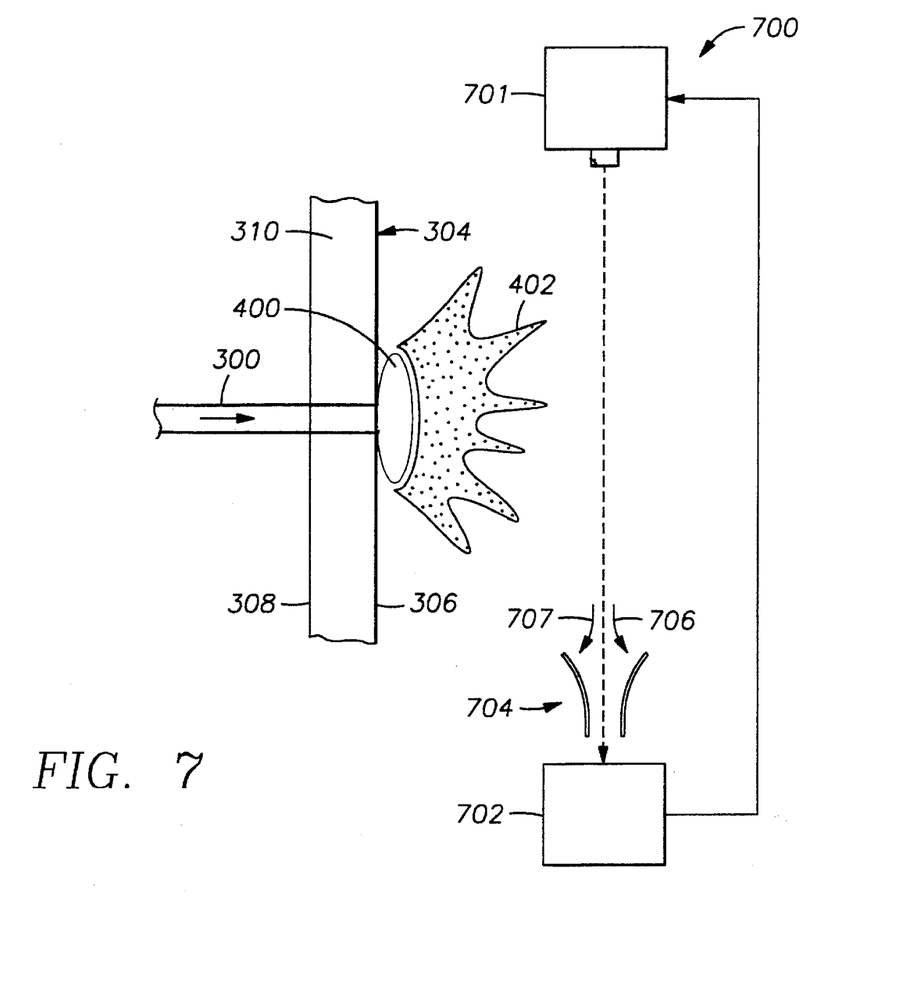
FIG. 7 is a diagram illustrating a second embodiment of a print collector of the invention.

Alternatively, the print collector 508 may, comprise a fluid flow device 700 and a pair of charged venturi plates 704 positioned near the coated surface 306 of the sheet 304. The fluid flow device 700 comprises a fluid source 701 and a fluid 702 receiver/pump 702. During times when coating 402 is being discharged from the sheet 304, the fluid source 701 flows a sheet of a fluid vehicle past the coated surface 306 to collect the discharged particles of coating. The fluid vehicle may comprise an inert gas such as Argon, for example. When the fluid flows between the venturi plates 704, and the coating particles are attracted to the ionized surface of the plates 704, as shown by the arrows 706–707. After the venturi plates 704 extract the coating particles from the fluid vehicle, the fluid receiver/pump 702 receives the fluid vehicle and pumps or otherwise returns the fluid to the source 701.

The venturi plates 704 comprise an ionized surface, shaped to increase the velocity and decrease the pressure of fluid passing between the venturi plates 704. Particles of coating in the low-pressure area proximate the venturi plates 704 are attracted to the ionized surface, where they are collected.

As another alternative, the print collector 508 may comprise a "discharge net," adapted from such devices used for pollution cleaning in electric power stations. These nets employ an array of charged collector elements to electrically remove particles from the air.

If desired, coating particles collected by the print collector 508 may be recycled by re-using the particles to imprint the same or other sheets. If the coating comprises copier toner, for example, the collected toner particles may be replaced into an empty copier toner cartridge.

For enhanced document cleaning, the apparatus 500 may also includes a bleach bath 510. The bleach bath 510 functions to eliminate any glue, binder, or other residue remaining after removal of particles of coating 402 removed from the sheet 304. The bath 510 preferably employs a bleaching agent and an oxidizer, for example. In one embodiment, the bleaching agent comprises a chlorine-based chemical and the oxidizer includes a 30% concentration of hydrogen peroxide in water. Alternatively, the oxidizer may employ a 40–45% concentration of potassium permangarate, and then a solution of hydrogen peroxide. A drying bath 512 may be employed to remove any residual water remaining after exposure of the sheet to the hydrogen peroxide bath or other bleaching substance used in the bleach bath 510. The drying bath 512 may comprise an alcohol such as methyl alcohol, for example. The drying bath 512 preferably includes a set of pinch rollers (not shown) to quickly remove any remaining moisture. Finally, the apparatus 500 may use a fan 514 to air dry the erased, bleached sheet. The apparatus 500 therefore provides a sheet 504 that is fully erased, bleached, and dried.

Operation

Figure 8:
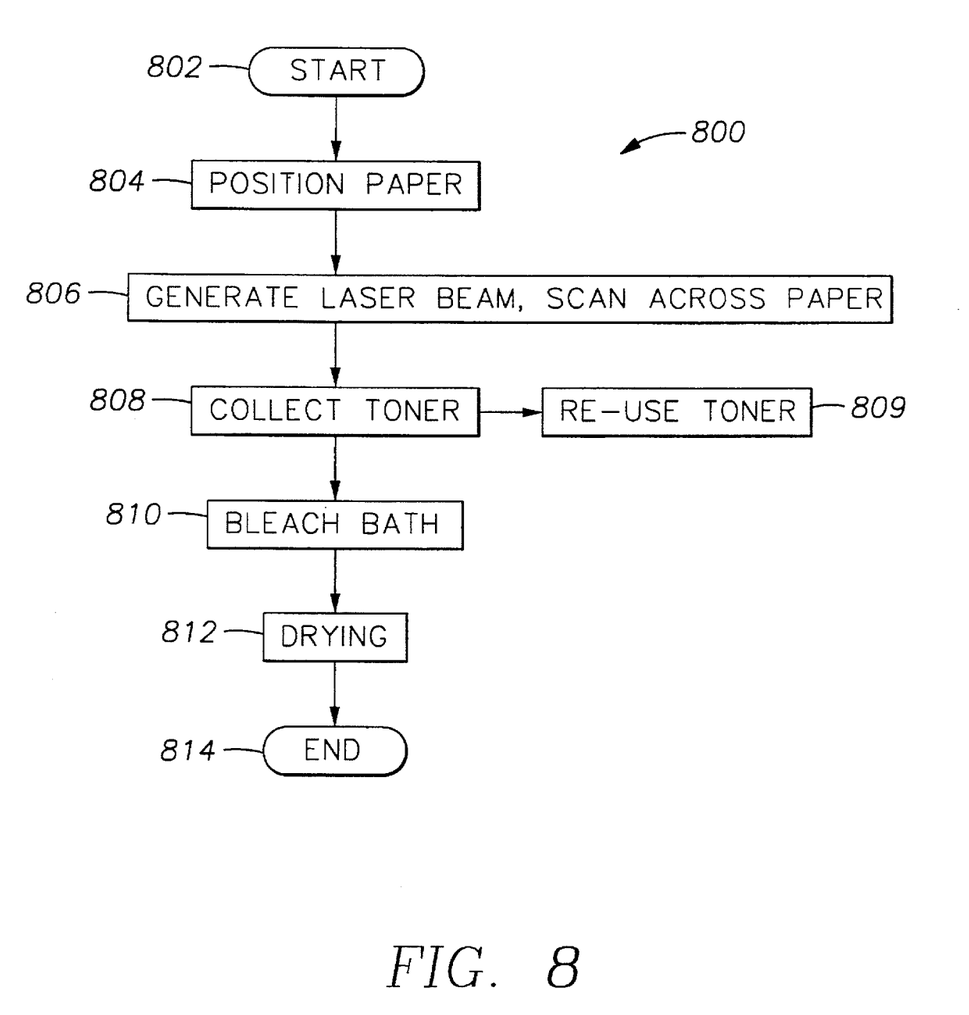
FIG. 8 is a flowchart illustrating an exemplary sequence of method steps in accordance with the invention

Broadly, the method aspect of the invention concerns the recycling of objects having a coated surface by irradiation from the object's (uncoated) undersurface with a laser light source. FIG. 8 depicts a specific example of the method of the present invention, in the form of a sequence of tasks 800. For ease, consistency, and specificity of illustration, the tasks 800 address the operation of a specific embodiment, concerning the recycling of paper imprinted with printer toner, copier toner, or laserjet toner. However, as mentioned above, the invention also applies to objects made from materials other than paper, or even to objects having shapes other than sheets or pages.

After initiation in task 802, the conveyor 504 receives and positions a printed sheet 304 of paper in task 804. Then, as shown in FIGS. 3 and 5, the laser 506 in task 806 generates a beam 300 that passes through the (uncoated) entry surface 308 and body 310 of the sheet 304 before irradiating the sheet's coated surface 306. In the illustrated embodiment, the laser beam 300 preferably has a 90° angle of incidence with respect to the sheet 304. The wavelength of the beam 300 is selected in relation to the composition of the sheet 304 so that the sheet 304 appears to be partially or completely transparent to the beam 300. To erase toner from all areas of the sheet 304, the laser beam and the sheet 304 may be moved relative to each other. In one embodiment, the screener 507 selectively scans the laser beam (or laser array) across the sheet 304. Alternatively, the conveyor 504 may move the sheet 304 relative to the laser 506 or a combination of the two may be used.

The laser 506 creases a plasma shock wave, oriented outward from the coated surface 306, causing the toner to be discharged away from the sheet, thereby avoiding any impregnation of toner particles into the sheet. In task 808, the print collector 508 collects the discharged toner particles. In the case of the ionized conductive plate 600 (FIG. 6), the plate 600 electrically attracts and collects particles of coating 402 ejected from the sheet 304. Moreover, the collector plate 600 may periodically reverse its charge to expel the collected toner.

Alternatively, task 808 may be performed using the fluid source 701 (FIG. 7) may flow a fluid sheet past the coated surface 306 to collect the discharged particles of coating. As the fluid flows into the ionized surface of the venturi plates 704, the toner particles move toward the ionized surface as shown by the arrows 706–707. As the fluid source 701 supplies the fluid sheet, the fluid receiver/pump 702 continually receives the fluid vehicle and returns the fluid to the source 701.

If desired, the collected toner may be re-used in task 809, for example by placing the toner into the toner cartridge of a printer or a copier.

After task 808, the object 304 in task 810 is placed into a bleach bath 510 for whitening. The object 304 is then dried in task 812. As an example, the drying steps may include submersion in a methyl-alcohol bath 512 to remove water created during the bleach bath, passing the sheet through pinch rollers to remove excess moisture, and then air drying by a fan 514. After task 812, the process ends in task 814.

Other Embodiments

While there have been shown what are presently considered to be preferred embodiments of the invention, it will be apparent to those skilled in the art that various changes and modifications can be made herein without departing from the scope of the invention as defined by the appended claims.

The descriptions above, for example, have been made in the context of documents or objects coated on a single side. The invention nonetheless contemplates the recycling of documents or other objects coated on both sides. However, special care must be taken to avoid impregnating a coating on one side of the object during the process of erasing the coating on the opposite side. In particular, the laser 300 in this implementation preferably has an acute angle of incidence, such as 10°–20°, with respect to the object 304. In this case, the plasma is directed and expelled away from both the paper and the laser beam, minimizing any impregnation of coating material present on the laser's entry surface.

An alternate embodiment of the invention may be constructed to share a single laser among multiple different recycling devices. Multiple units may be constructed, each resembling the recycling apparatus without the laser. Each unit may be placed in different rooms of an office, for example, with each unit sharing a common laser. In this embodiment, the laser's beam is split or otherwise multiplied into many different beams, each of which is separately directed to a different remotely located unit. To provide the laser beam to the different units, the invention may employ fiber optic cable, waveguides, or another suitable light-conveying means.

What is claimed is:

1. A method for recycling a document having a first surface, a second surface bearing printed matter, and a body interposed between the first and second surfaces, said method comprising the steps of directing a laser beam through the first surface and the body to create a plasma shock wave at a target region of the second surface and ejecting printed matter proximate the target region.

2. The method of claim 1, wherein the document comprises paper.

3. The method of claim 1, wherein the printed matter comprises toner.

4. The method of claim 1, further comprising the steps of collecting the ejected printed matter.

5. The method of claim 4, wherein the steps of collecting the ejected printed matter comprise the steps of electrically attracting the ejected printed matter to a charged surface.

6. The method of claim 4, wherein the steps of collecting the ejected printed matter comprise the steps of:

flowing a fluid vehicle to transport the ejected printed matter away from the document; and collecting the transported printed matter from the fluid vehicle by electrical attraction to a charged surface.

7. The method of claim 4, further comprising the steps of recycling the collected printed matter by imprinting documents therewith.

8. The method of claim 1, further comprising the steps of imprinting the first surface of the recycled document.

9. The method of claim 1, further comprising the steps of bleaching the recycled document.

10. The method of claim 9, wherein the step of bleaching the recycled document comprises the steps of bathing the recycled document in a hydrogen peroxide bath.

11. The method of claim 10, further comprising the steps of bathing the bleached document in methyl alcohol to remove water.

12. The method of claim 9, further comprising the steps of fan drying the bleached document.

13. The method of claim 1, wherein the first surface is free from printed matter.

14. The method of claim 1, wherein the first surface bears printed matter and the laser beam is directed through the first surface at an acute angle thereto.

15. The method of claim 14, wherein the acute angle is between 10 and 20 degrees.

16. The method of claim 1, wherein the laser beam comprises multiple laser beams.

17. The method of claim 1, wherein the laser beam comprises one laser beam.

18. A method for cleaning printing from a sheet of recording media, comprising the following steps:

directing a laser beam into a body of the sheet through a first surface of the sheet, wherein the body is interposed between the first surface and an opposing second surface; and creating a plasma shock wave at a target region of the second surface to propel printing proximate the target region from the sheet.

19. The method of claim 18, wherein the sheet comprises paper.

20. The method of claim 18, wherein the printing comprises toner.

21. The method of claim 18, further comprising the steps of collecting the propelled printing.

22. The method of claim 21, wherein the steps of collecting the ejected printing comprise the steps of electrically attracting the propelled printing to a charged surface.

23. The method of claim 21, wherein the steps of collecting the propelled printing comprise the steps of:

flowing a fluid vehicle to transport the propelled printing matter away from the document; and collecting the transported printing from the fluid vehicle by electrical attraction to a charged surface.

24. The method of claim 21, further comprising the steps of recycling the collected printing by imprinting sheets therewith.

25. The method of claim 18, further comprising the steps of imprinting the first surface of the cleaned sheet.

26. The method of claim 18, further comprising the steps of bleaching the cleaned sheet.

27. The method of claim 26, wherein the step of bleaching the cleaned sheet comprises the steps of bathing the sheet in a hydrogen peroxide bath.

28. The method of claim 27, further comprising the steps of bathing the cleaned sheet in methyl alcohol to remove water.

29. The method of claim 26, further comprising the steps of fan drying the bleached sheet.

30. The method of claim 18, wherein the first surface is free from printing.

31. The method of claim 18, wherein the first surface bears printing and the laser beam is directed through the first surface at an acute angle thereto.

32. The method of claim 31, wherein the acute angle is between 10 and 20 degrees.

33. The method of claim 18, wherein the laser beam comprises multiple laser beams.

34. The method of claim 18, wherein the laser beam comprises one laser beam.

35. A method for erasing toner imprinted upon a first surface of a document sheet, where said sheet additionally includes a second surface and a body interposed between the surfaces, said method comprising:

directing a laser beam into the body through the second surface; and creating a plasma shock wave at a target region of the first surface to discharge toner proximate the target region from the sheet.

36. The method of claim 35, wherein the sheet comprises paper.

37. The method of claim 35, further comprising the steps of collecting the discharged toner.

38. The method of claim 37, wherein the steps of collecting the discharged toner comprise the steps of electrically attracting the discharged toner to a charged surface.

39. The method of claim 37, wherein the steps of collecting the discharged toner comprise the steps of:

flowing a fluid vehicle to transport the discharged toner matter away from the sheet; and collecting the transported toner from the fluid vehicle by electrical attraction to a charged surface.

40. The method of claim 37, further comprising the steps of recycling the collected toner by imprinting documents therewith.

41. The method of claim 35, further comprising the steps of imprinting the second surface of the erased sheet.

42. The method of claim 35, further comprising the steps of bleaching the erased sheet.

43. The method of claim 42, wherein the step of bleaching the erased sheet comprises the steps of bathing the erased sheet in a hydrogen peroxide bath.

44. The method of claim 43, further comprising the steps of bathing the erased sheet in methyl alcohol to remove water.

45. The method of claim 42, further comprising the steps of fan drying the bleached sheet.

46. The method of claim 35, wherein the second surface is free from toner.

47. The method of claim 35, wherein the second surface has toner imprinted thereon and the laser beam is directed through the second surface at an acute angle thereto.

48. The method of claim 47, wherein the acute angle is between 10 and 20 degrees.

49. The method of claim 35, wherein the laser beam comprises multiple laser beams.

50. The method of claim 35, wherein the laser beam comprises one laser beam.

51. A method to perform surface cleaning of a substantially flat paper object that includes a first surface having a coating adhered thereto, said method comprising the steps of using a laser to irradiate a target region of the first surface from within the body to remove the coating proximate the target region.

52. The method of claim 51, wherein the object comprises at least one sheet of paper.

53. The method of claim 51, wherein the coating comprises toner.

54. The method of claim 51, further comprising the steps of collecting the removed coating.

55. The method of claim 54, wherein the steps of collecting the removed coating comprise the steps of electrically attracting the removed coating to a charged surface.

56. The method of claim 54, wherein the steps of collecting the removed coating comprise the steps of:

flowing a fluid vehicle to transport the removed coating matter away from the object; and collecting the transported coating from the fluid vehicle by electrical attraction to a charged surface.

57. The method of claim 54, further comprising the steps of recycling the collected coating by imprinting objects therewith.

58. The method of claim 51, further comprising the steps of imprinting a second surface of the cleaned object.

59. The method of claim 51, further comprising the steps of bleaching the cleaned object.

60. The method of claim 59, wherein the step of bleaching the cleaned object comprises the steps of bathing the cleaned object in a hydrogen peroxide bath.

61. The method of claim 60, further comprising the steps of bathing the bleached object in methyl alcohol to remove water.

62. The method of claim 59, further comprising the steps of fan drying the bleached object.

63. The method of claim 51, wherein the object includes a second surface substantially opposing the first surface, the second surface being free from coating adhered thereto.

64. The method of claim 51, wherein the object includes a second surface substantially opposing the first surface, the second surface having a coating adhered thereto and the step of irradiating the target region includes a step of directing a laser beam at an acute angle to the second surface.

65. The method of claim 64, wherein the acute angle is between 10 and 20 degrees.

66. The method of claim 51, wherein the laser comprises multiple lasers.

67. The method of claim 51, wherein the laser comprises one laser.

68. A document recycling apparatus, comprising:

a document conveyor to receive and position documents, each document having first and second surfaces with a body interposed therebetween, said first surfaces bearing printed matter;

a laser positioned proximate the document conveyor to direct a laser beam first through the second surface and then the body of a document positioned by the document conveyor and create a plasma shock wave to forcibly eject printing material from the first surface; and a print collector positioned proximate the document conveyor to face the first surface of documents positioned by the document conveyor and collect said ejected printing material.

69. The apparatus of claim 68, wherein the document conveyor includes a roller.

70. The apparatus of claim 68, wherein the document conveyor includes a belt.

71. The apparatus of claim 68, wherein the document conveyor includes a slidable tray.

72. The apparatus of claim 68, wherein the documents comprise paper.

73. The apparatus of claim 68, wherein the documents comprise translucent plastic.

74. The apparatus of claim 68, wherein the printing material comprises toner.

75. The apparatus of claim 68, wherein the laser comprises a Nd:YAG laser.

76. The apparatus of claim 68, wherein the laser comprises a semiconductor laser.

77. The apparatus of claim 68, wherein the laser comprises multiple diode lasers arranged in an array.

78. The apparatus of claim 68, wherein the laser comprises a Dye laser.

79. The apparatus of claim 68, wherein the laser comprises a Ruby laser.

80. The apparatus of claim 68, wherein the laser comprises a device to direct a laser beam and create a plasma shock wave at a target region of the document to forcibly eject printing material proximate the target region from the first surface.

81. The apparatus of claim 68, wherein the laser is positioned with respect to the document conveyor to direct the laser beam through the second surface at an acute angle thereto.

82. The apparatus of claim 81, wherein the acute angle is between 10 and 20 degrees.

83. The apparatus of claim 68, further comprising a scanning mechanism operably coupled to the laser.

84. The apparatus of claim 83, wherein the scanning mechanism comprises a selectively rotatable reflector.

85. The apparatus of claim 68, wherein the print collector comprises a charged surface.

86. The apparatus of claim 68, wherein the print collector comprises a fluid stream to convey ejected printed material from the document.

87. The apparatus of claim 86, wherein the print collector further comprises a venturi including a charged surface to collect printing material from the fluid stream.

88. The apparatus of claim 68, further comprising a bleaching bath positioned proximate the document conveyor to receive and bathe documents after ejection of printing material therefrom.

89. The apparatus of claim 88, wherein the bleaching bath comprises hydrogen peroxide.

90. The apparatus of claim 88, further comprising a alcohol bath to remove water from documents after bathing.

91. The apparatus of claim 88, further comprising a fan to dry documents after bathing.

92. The apparatus of claim 68, wherein the laser comprises multiple lasers.

93. The apparatus of claim 68, wherein the laser comprises one laser.

94. An apparatus for erasing sheets of recording media, each said sheet including a printed surface, an opposing surface, and a body interposed therebetween, the apparatus comprising:

a support member to support the medium; and a laser to direct a beam into the medium first through the opposing surface and then through the body to create a plasma shock wave at a target region of the printed surface to propel printed matter adhered to the printed surface proximate the target region from the medium.

95. The apparatus of claim 94, wherein the laser beam is positioned to direct the laser beam through the opposing surface at a selected acute angle thereto.

96. The apparatus of claim 95, wherein the acute angle is between 10 and 20 degrees.

97. The apparatus of claim 94, wherein the laser comprises multiple lasers.

98. The apparatus of claim 94, wherein the laser comprises one laser.

99. An apparatus to perform surface cleaning of a substantially flat paper object that includes a coated surface having a coating adhered thereto, a second surface, and a body positioned between the surfaces, said apparatus comprising:

a positioner to support the paper object in a selected position; and a laser positioned proximate the positioner to impinge a laser beam upon a target region of the coating from within the paper object's body to forcibly remove the coating proximate the target region.

100. A machine for erasing toner from a first surface of a sheet of paper, where said sheet additionally includes a second surface and a Body interposed between the surfaces, said apparatus comprising:

a laser to direct a laser beam into the body via the second surface and create a plasma shock wave at a target region of the first surface to propel toner proximate the target region from the sheet; and a toner collector proximate the first surface.

101. The apparatus of claim 100, wherein the laser is positioned to direct the laser beam through the second surface at an acute angle thereto.

102. The apparatus of claim 101, wherein the acute angle is between 10 and 20 degrees.

103. A method to perform surface cleaning of a translucent object that includes a first surface having a coating of toner adhered thereto, said method comprising the steps of using a laser to irradiate a target region of the first surface from within the body to forcibly remove the toner proximate the target region.

104. A method to perform surface cleaning of a translucent object that includes a first surface having a coating adhered thereto, said method comprising the steps of:

using a laser to irradiate a target region of the first surface from within the body to forcibly remove the coating proximate the target region; and collecting the removed coating by electrically attracting the removed coating to a charged surface.

105. A method to perform surface cleaning of a translucent object that includes a first surface having a coating adhered thereto, said method comprising the steps of:

using a laser to irradiate a target region of the first surface from within the body to forcibly remove the coating proximate the target region; and collecting the removed coating by performing steps comprising:

flowing a fluid vehicle to transport the removed coating matter away from the object;

collecting the transported coating from the fluid vehicle by electrical attraction to a charged surface.

106. A method to perform surface cleaning of a translucent object that includes a first surface having a coating adhered thereto, said method comprising the steps of:

using a laser to irradiate a target region of the first surface from within the body to forcibly remove the coating proximate the target region; and imprinting a second surface of the cleaned object.

107. A method to perform surface cleaning of a translucent object that includes a first surface having a coating adhered thereto, said method comprising the steps of:

using a laser to irradiate a target region of the first surface from within the body to forcibly remove the coating proximate the target region; and bleaching the cleaned object.

108. The method of claim 107, wherein the step of bleaching the cleaned object comprises the steps of bathing the cleaned object in a hydrogen peroxide bath.

109. The method of claim 108, further comprising the steps of bathing the bleached object in methyl alcohol to remove water.

110. The method of claim 107, further comprising the steps of fan drying the bleached object.

111. A method for recycling a substantially flat paper object having a first surface bearing a coating material, a second surface, and a body interposed between the first and second surfaces, said method comprising the steps of directing a laser beam through the first surface and the body at a target region of the second surface and ejecting coating material proximate the target region.

112. A method for recycling a light-transmissive object having a first surface having printing material coated thereon, a second surface, and a body interposed between the first and second surfaces, said method comprising the steps of directing a laser beam through the first surface and the body at a target region of the second surface and ejecting printing material proximate the target region.

113. The method of claim 112, the printing material comprising laser printer toner.

114. The method of claim 112, the printing material comprising copier toner.

115. The method of claim 112, the printing material comprising ink.

* * * * *

UNITED STATES PATENT AND TRADEMARK OFFICE
CERTIFICATE OF CORRECTION

PATENT NO. : 5,614,339
DATED : March 25, 1997
INVENTOR(S) : Nikolai Tankovich

It is certified that error appears in the above-indentified patent and that said Letters Patent is hereby corrected as shown below:

On title page, item [54] and col. 1,

Change "Object Recycling By Laser of Coating Material" to --Object Recycling By Laser Erasure of Coating Material--.

Column 12, line 12, change "Body" to --body--.

Signed and Sealed this

Twelfth Day of August, 1997

Attest:

*Attesting Officer*

BRUCE LEHMAN

*Commissioner of Patents and Trademarks*